(12) United States Patent
Miyasaka

(10) Patent No.: US 8,489,798 B2
(45) Date of Patent: Jul. 16, 2013

(54) ELECTRONIC DEVICE, CONTROL METHOD THEREOF AND RECORDING MEDIUM

(75) Inventor: Masayo Miyasaka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 71 days.

(21) Appl. No.: 12/905,846

(22) Filed: Oct. 15, 2010

(65) Prior Publication Data

US 2011/0093642 A1 Apr. 21, 2011

(30) Foreign Application Priority Data

Oct. 15, 2009 (JP) ................................. 2009-238268
Jun. 17, 2010 (JP) ................................. 2010-137997

(51) Int. Cl.
*G06F 13/00* (2006.01)
(52) U.S. Cl.
USPC ........................................... 710/316; 710/38
(58) Field of Classification Search
USPC .................................................. 710/316, 38
See application file for complete search history.

(56) References Cited

U.S. PATENT DOCUMENTS

| | | | | |
|---|---|---|---|---|
| 5,517,630 | A * | 5/1996 | Tasaki | 711/5 |
| 6,857,034 | B1 * | 2/2005 | DiSanza et al. | 710/106 |
| 7,346,729 | B2 * | 3/2008 | Watanabe | 710/313 |
| 7,552,362 | B2 * | 6/2009 | Fukui et al. | 714/44 |
| 2003/0123074 | A1 | 7/2003 | Imai et al. | |
| 2005/0213149 | A1 * | 9/2005 | Kuwahara | 358/1.15 |
| 2007/0245057 | A1 * | 10/2007 | Bohm et al. | 710/313 |
| 2010/0030925 | A1 * | 2/2010 | Inoue | 710/16 |

FOREIGN PATENT DOCUMENTS

| | | |
|---|---|---|
| CN | 1672949 A | 9/2005 |
| EP | 0 820 185 A2 | 1/1998 |
| JP | 2000-353145 A | 12/2000 |
| JP | 2001-060961 A | 3/2001 |
| JP | 2001-184296 A | 7/2001 |

OTHER PUBLICATIONS

Extended European Search Report, Application No. 10187434.5 issued on Mar. 3, 2011.
Fischer, W., IEEE Standard for a Common Mezzanine Card (CMC) Family Microprocessor & Microcomputer Standards Committee (MMMSC) of the IEEE Computer Society, Jun. 14, 2001.
USB 2.0 Controller Welland U-PCI-v2.0-5, MEGAPLUS, Publication date: Apr. 16, 2001.
IEEE Standard for a Common Mezzanine Card (CMC) Family, Microprocessor & Microcomputer Standards Committee (MMSC) of the IEEE Computer Society, IEEE-SA Standards Board, Jun. 14, 2001, (pp. 1-42).

* cited by examiner

*Primary Examiner* — Nimesh G Patel

(57) ABSTRACT

An electronic device is connectable to an external device. An interface substrate is detachably connected to a main substrate. A first interface is installed on the interface substrate, and the first interface which is connectable to the external device. A second interface is installed on the main substrate, and the second interface which is connectable to the external device. A selection unit selects one interface of the first interface on the interface substrate and the second interface on the main substrate. A communication unit communicates information with the external device through the interface selected by the selection unit. The selection unit selects an interface which is pre-designated or preferentially selects an interface which first receives a signal from the external device, between the first interface and the second interface.

13 Claims, 6 Drawing Sheets

ELECTRONIC DEVICE, CONTROL METHOD THEREOF AND RECORDING MEDIUM

This application claims priority to Japanese Patent Application No. 2009-238268 filed on Oct. 15, 2009 and Japanese Patent Application No. 2010-137997 filed on Jun. 17, 2010. The disclosures of which are incorporated herein by reference in their entirety.

BACKGROUND

The present invention relates to an electronic device connected to an external device, a control method thereof and a recording medium.

In the related art, electronic devices which are connected to external devices through interfaces such as USB (Universal Serial Bus) or the like are known. Although such devices are typically connected to external devices in a one-to-one manner, a configuration that enables one electronic device to make a USB-connection with a plurality of external devices, for example, by switching connections through a USB switch, is known (For example, see Patent Document 1).
[Patent Document 1] JP-A-2000-353145

As described in Patent Document 1, as a method of connecting an electronic device, which connects to external devices in a one-to-one manner, to a plurality of external devices, it is reasonable to provide a configuration that makes one external device communicable with an electronic device by performing switching of the external devices. Even in this case, however, although it is possible to install a plurality of interfaces in the electronic device itself, the external device and the electronic device communicate with each other in a one-to-one manner through selection of any one interface. However, it is not easy to appropriately select one interface from the plurality of interfaces, and thus there is a demand for a scheme for efficiently selecting one interface.

SUMMARY

It is therefore an object of at least one embodiment of the present invention to rapidly and efficiently select any one interface in the case where an electronic device has a plurality of interfaces that is connected to an external device.

In order to achieve at least one of the above-described objects, according to a first aspect of the embodiments of the present invention, there is provided an electronic device which is connectable to an external device, comprising: a main substrate; an interface substrate which is detachably connected to the main substrate; a first interface which is installed on the interface substrate side, the first interface which is connectable to the external device; a second interface which is installed on the main substrate side, the second interface which is connectable to the external device; a selection unit that selects one interface of the first interface on the interface substrate and the second interface on the main substrate; and a communication unit that communicates information with the external device through the interface selected by the selection unit, wherein the selection unit selects an interface which is pre-designated or preferentially selects an interface which first receives a signal from the external device, between the first interface and the second interface.

According to the above configuration, the first interface connectable to the external device is provided on the interface substrate and the second interface connectable to the external device is provided on the main substrate. The selection unit that selects one of the first and second interfaces selects an interface which is pre-designated or preferentially selects an interface which is first connected to the external device. Accordingly, since the pre-designated interface or the interface which is first connected to the external device by a user is selected between the two interfaces, a necessary interface can be rapidly and efficiently selected to perform communication with the external device.

In the above-described electronic device, the electronic device may further comprise a switch that designates one interface of the first interface and the second interface, or a storage unit that stores information for designating one interface of the first interface and the second interface, and the selection unit may acquire designation information of the switch or the storage unit when the electronic device is powered on or when receiving a reset command or a reset signal from the external device and the selection unit selects the interface which is pre-designated by the designation information.

According to the above configuration, the interface to be selected between the first and second interfaces can be easily designated by the switch or the designation information stored in the storage unit.

In the above-described electronic device, when receiving a predetermined command including information for designating one interface of the first interface and the second interface, the selection unit may select the interface which is pre-designated by the information in the predetermined command.

According to the above configuration, by receiving the command from the external device, the interface to be selected between the first and second interfaces can be easily designated.

In the above-described electronic device, the selection unit may select the second interface when the first interface is pre-designated by the designation information of the switch or the storage unit and the interface substrate is not connected to the main substrate.

According to the above configuration, in the case where the external device is unable to be connected to the pre-designated interface, the other interface is selected to be communicable with the external device. For example, even in the case where the designated interface substrate is not connected due to maintenance circumstances or an operational error, the connection to the external device can be made by the other interface. Accordingly, in the case where the selection of the designated interface is not possible, another interface is selected regardless of the designation, and thus the possibility of connection to the external device is constantly maintained.

In the above-described electronic device, the electronic device may further comprise a third interface which is installed on the interface substrate side, the third interface which is connectable a controlled device, the second interface may be configured to receive control information for controlling the electronic device from the external device, the first interface may be configured to receive the control information for controlling the electronic device and control information for controlling the controlled device from the external device, the interface substrate may be provided with a separation unit that discriminates and separates the control information for the electronic device and the control information for the controlled device, which are input from the external device through the first interface, and the separation unit may output the separated control information for the controlled device to the controlled device through the third interface and outputs the separated control information for the electronic device to the main substrate.

According to the above configuration, the controlled device is connected by the third interface, and the information input from the external device through the first or second interface is separated into the control information of the electronic device and the control information of the controlled device to be output to the main substrate and the controlled device, respectively. Accordingly, in the case where the interface substrate has a function of outputting the control information to the controlled device, a necessary interface can be rapidly selected between the first interface on the interface substrate and the second interface on the main substrate, and it is possible to communicate with the external device and output the control information to the controlled device.

In the above-described electronic device, the control information for the electronic device, which is input through the second interface and the control information for the electronic device, which is separated by the separation unit of the interface substrate may be selected by the selection unit, and then input to the communication unit in common.

According to the above configuration, since the control information for the electronic device input from the first interface and separated and the control information input from the second interface are processed by the common communication unit, the circuit can be commonly used in order to omit an unnecessary circuit configuration, and thus the configuration and the operation of the circuit become efficient.

According to a second aspect of the embodiments of the present invention, there is provided a method of controlling an electronic device which is connectable to an external device, the electronic device including: a main substrate; an interface substrate which is detachably connected to the main substrate; a first interface which is installed on the interface substrate side, the first interface which is connectable to the external device; and a second interface which is installed on the main substrate side, the second interface which is connectable to the external device, the method comprising: selecting an interface which is pre-designated or preferentially selecting an interface which first receives a signal from the external device, between the first interface on the interface substrate and the second interface on the main substrate; and communicating information with the external device through the selected interface.

According to the above configuration, the first interface connectable to the external device is provided on the interface substrate and the second interface connectable to the external device is provided on the main substrate. When the electronic device selects one of the first and second interfaces, an interface which is pre-designated is selected or an interface which is first connected to the external device, is preferentially selected. Accordingly, since the pre-designated interface or the interface which is first connected to the external device by a user is selected between the two interfaces, a necessary interface can be rapidly and efficiently selected to perform communication with the external device.

In the above-described method, the electronic device may further include a switch that designates one interface of the first interface and the second interface, or a storage unit that stores information for designating one interface of the first interface and the second interface, the method may further comprise acquiring designation information of the switch or the storage unit when the electronic device is powered on or when receiving a reset command or a reset signal from the external device, and the interface which is pre-designated by the designation information may be selected in the selecting.

According to the above configuration, the interface to be selected between the first and second interfaces can be easily designated by the switch or the designation information stored in the storage unit.

In the above-described method, when receiving a predetermined command including information for designating one interface of the first interface and the second interface, the interface which is pre-designated by the information in the predetermined command may be selected in the selecting.

According to the above configuration, by receiving the command from the external device, the interface to be selected between the first and second interfaces can be easily designated.

In the above-described method, the second interface may be selected in the selecting when the first interface is pre-designated by the designation information of the switch or the storage unit and the interface substrate is not connected to the main substrate.

According to the above configuration, in the case where the external device is unable to be connected to the pre-designated interface, the other interface is selected to be communicable with the external device. For example, even in the case where the designated interface substrate is not connected due to maintenance circumstances or an operational error, the connection to the external device can be made by the other interface. Accordingly, in the case where the selection of the designated interface is not possible, another interface is selected regardless of the designation, and thus the possibility of connection to the external device is constantly maintained.

In the above-described method, the electronic device may further include a third interface which is installed on the interface substrate side, the third interface which is connectable a controlled device, the second interface may be configured to receive control information for controlling the electronic device from the external device, the first interface may be configured to receive the control information for controlling the electronic device and control information for controlling the controlled device from the external device, and the method may further comprise: discriminating and separating, by the interface substrate, the control information for the electronic device and the control information for the controlled device, which are input from the external device through the first interface; outputting the separated control information for the controlled device to the controlled device through the third interface, and outputting the separated control information for the electronic device to the main substrate.

According to the above configuration, the controlled device is connected by the third interface, and the information input from the external device through the first or second interface is separated into the control information of the electronic device and the control information of the controlled device to be output to the main substrate and the controlled device, respectively. Accordingly, in the case where the interface substrate has a function of outputting the control information to the controlled device, a necessary interface can be rapidly selected between the first interface on the interface substrate and the second interface on the main substrate, and it is possible to communicate with the external device and output the control information to the controlled device.

In the above-described method, the method may further comprise inputting the control information for the electronic device, which is input through the second interface and the control information for the electronic device, which is separated by the separation unit of the interface substrate, to the communication unit in common.

According to the above configuration, since the control information for the electronic device input from the first interface and separated and the control information input from the second interface are processed by the common communication unit, the circuit can be commonly used in order to omit an unnecessary circuit configuration, and thus the configuration and the operation of the circuit become efficient.

According to a third aspect of the embodiments of the present invention, there is provided a recording medium recording a program causing a controller of an electronic device to execute a method of controlling the electronic device which is connectable to an external device, the electronic device including: a main substrate provided with the controller; an interface substrate which is detachably connected to the main substrate; a first interface which is installed on the interface substrate side, the first interface which is connectable to the external device; and a second interface which is installed on the main substrate side, the second interface which is connectable to the external device, the method comprising: selecting an interface which is pre-designated or preferentially selecting an interface which first receives a signal from the external device, between the first interface on the interface substrate and the second interface on the main substrate; and communicating information with the external device through the selected interface.

According to the above configuration, the first interface connectable to the external device is provided on the interface substrate and the second interface connectable to the external device is provided on the main substrate. When the electronic device selects one of the first and second interfaces, an interface which is pre-designated is selected or an interface which is first connected to the external device is preferentially selected. Accordingly, since the pre-designated interface or the interface which is first connected to the external device by a user is selected between the two interfaces, a necessary interface can be rapidly and efficiently selected to perform communication with the external device.

According to the aspects of the embodiments of the present invention, in the configuration having a plurality of interfaces connectable to the external device, a necessary interface can be rapidly and efficiently selected, and thus the communication with the external device can be performed.

DETAILED DESCRIPTION OF THE EMBODIMENTS

Hereinafter, preferred embodiments of the present invention will be described with reference to the accompanying drawings.

First Embodiment

Figure 1:
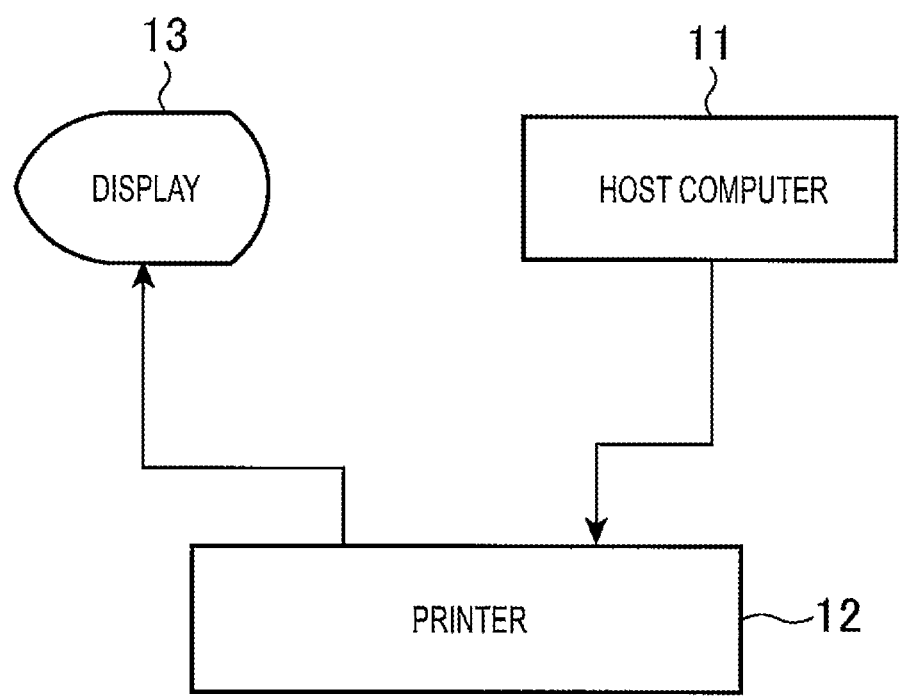
FIG. 1 is a block diagram illustrating the brief configuration of a POS terminal system according to an embodiment of the present invention.

FIG. 1 is a block diagram illustrating the brief configuration of a POS terminal system according to a first embodiment of the present invention.

A POS terminal system 10 is connected to a POS management computer (not illustrated) through a network (not illustrated). The POS terminal system 10 includes a host computer 11 as an external device that performs various kinds of control operations in the POS terminal system 10, a plurality of USB (Universal Serial Bus) connectors (parts of interfaces), a printer 12 as an electronic device connected to the host computer 11 through any one of the USB connectors to perform printing of such as receipt, coupon, and the like, and a display (customer display) 13 connected to the printer 12 and to an RS232C connector (a third interface, see FIG. 2) 32 that performs display of various kinds of information through the printer 12 as another controlled device under the control of the host computer 11.

Figure 2:
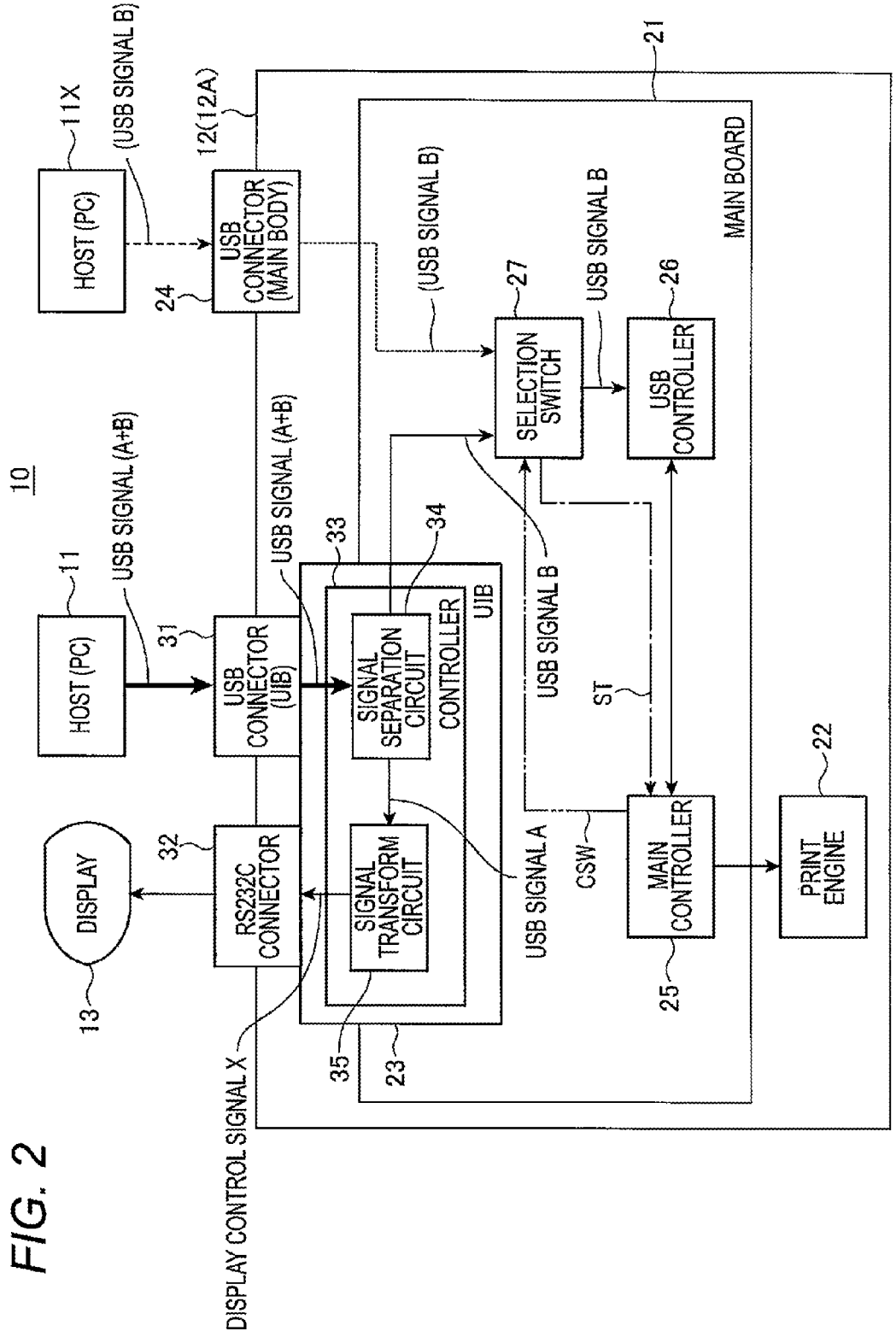
FIG. 2 is a block diagram illustrating the brief configuration of a printer.

FIG. 2 is a block diagram illustrating the brief configuration of a printer.

The printer 12 briefly includes a main board (main body substrate) pivotally controlling the printer 12, a print engine 22 including a mechanism that performs an actual print under the control of the main board 21, a universal interface board (UIB) (interface substrate) 23 as an extension board connected to an option board connector (not illustrated) provided in the main board 21, and a USB connector (a part of second interface) 24 installed in a printer main body 12A.

The main board 21 includes a main controller 25 pivotally controlling the main board 21, a USB controller (communication unit) 26 performing an interface operation of a USB signal, and a selection switch (selection unit) 27 exclusively selecting a USB signal B (control information B) corresponding to the control signal for controlling the printer input from the UIB 23 or USB connector 24 and outputting the selected USB signal B to the USB controller 26.

The UIB 23 includes a USB connector (a part of first interface) 31 to which any USB signal (A+B) between a USB signal A (control information A) for controlling the display 13 and a USB signal B for controlling the printer 12 is input from the host computer 11, an RS232C connector 32 connected to the display 13, and a controller 33 pivotally controlling the UIB 23.

Here, the USB signal (A+B) is a signal in which a series of control information for controlling the display 13 and a series of control information for controlling the printer 12 are transmitted in a time series manner at predetermined intervals. In this case, if the USB signal (A+B) including the USB signal A is input to the USB connector 24, the USB controller 26 is unable to appropriately process the USB signal (A+B), and thus does not operate normally.

Accordingly, it is not necessary that the host computer 11 outputting the USB signal (A+B) is connected to the USB connector 31.

By contrast, even in the case where the USB signal B is input to any one between the USB connector 24 and the USB connector 31, the USB controller 26 can appropriately process the USB signal B, and thus it is possible that the host computer 11X that outputs the USB signal B is connected to any one between the USB connector 24 and the USB connector 31. However, in the case where the host computer is connected to the USB connector 24, the display through the display 13 is unable to be performed.

Also, the selection switch 27 may be a memory switch or a signal selection circuit based on a DIP switch.

The controller 33 is composed of a microcomputer (not illustrated) having a CUP, ROM, and RAM. The ROM stores a program that included a control system of the printer 12 and the control system of the display 13, and the CPU includes a signal separation circuit (separation unit) 34 which determines which control system the USB signal (A+B) input from the USB connector 31 is control information based on, separates the USB signal A and the USB signal B from each other, and outputs the USB signal B to the selection switch 27, and s signal transform circuit (transform unit) 35 which receives an input of the USB signal A separated by the signal separation circuit 34, transforms the USB signal A into a signal for the RS232C interface, and outputs the transformed signal to the display 13 through the RS232C connector 32 as a display control signal X for controlling the display 13. The USB signal (A+B) includes ID information that indicates any one between the printer 12 and the display 13 in the forefront of the series of control information, and the controller 33 separates the USB signal A and the USB signal B from each other based on the ID information.

Next, the detailed operation will be described.

First, a case where the USB connector 31 is connected to the host computer 11 that outputs the USB signal (A+B) that is one of signals for controlling the printer 12 and the display 13 will be described.

In this case, it is assumed that the selection switch 27 has been already shifted to the side of the UIB 23 (USB connector 31).

The host computer 11 outputs the USB signal (A+B) to the UM 23 through the USB connector 31.

The signal separation circuit 34 of the UIB 23, if the USB signal (A+B) is input thereto through the USB connector 31, separates the USB signal A that is the control information of the display 13 and the USB signal B that is the control information of the printer 12 from each other. Also, the signal separation circuit 34 outputs the USB signal A to the signal transform circuit 35, and outputs the USB signal B to the selection switch 27.

The signal transform circuit 35, to which the USB signal A has been input, transforms the USB signal A into a signal for the RS232C interface that is a display control signal X, and outputs the transformed signal to the display 13 through the RS232C connector.

As a result, on the display screen of the display 13, information such a product price, name, the sum of purchased amounts, and the like, and sales information are displayed, and a customer can confirm them.

On the other hand, the USB signal B is input to the USB controller 26 through the selection switch 27.

Accordingly, the USB controller 26 passes the main controller 25 the control information corresponding to the USB signal. B.

The main controller 25 performs various kinds of printing of such as receipt, a coupon, and the like, by controlling the print engine 22 based on the control information.

Next, a case where the USB connector 24 is connected to the host computer 11X that outputs the USB signal B as the control signal for controlling the printer (information processing device) 12 will be described.

In this case, it is assumed that the selection switch 27 has been already shifted to the side of the USB connector (main body) 24.

If the host computer 11X outputs the USB signal B through the USB connector 31, the USB signal B is input to the USB controller 28 through the selection switch 27.

Accordingly, the USB controller 26 passes the main controller 25 the control information corresponding to the USB signal B, and the main controller 25 performs various kinds of printing of such as a receipt, a coupon, and the like, by controlling the print engine 22 based on the control information.

As described above, according to the first embodiment of the present invention, in the case of connecting the host computer 11X to the USB controller 24 and in the case of connecting the host computer 11 to the USB connector 31, one USB controller 26 can be shared.

Accordingly, since it is not necessary to install a separate USB controller on the side of the UIB 23, it becomes possible to restrict the manufacturing cost, and further the cost for introduction of the POS terminal system 10 can be reduced. Also, miniaturization of the main board 21 and the printer 12 become possible.

Also, on the side of the UIB 23, the RS232C connector 32 that is connectable to the display 13 is provided. The control information for controlling the printer 12 is input from the host computer 11 to the USB connector 24, and the control information for controlling the printer 12 and the control information for controlling the display 13 are input from the host computer 11 to the USB connector 31. The UIB 23 includes the signal separation circuit 34 that discriminates and separates the control information of the printer 12 and the control information of the display 13 which are input from the host computer 11 through the USB connector 31. The UIB 23 outputs the control information of the display 13 separated by the signal separation circuit 34 to the display 13 through the RS232C connector 32, and outputs the control information of the printer 12 separated by the signal separation circuit 34 to the main board 21. Accordingly, a necessary connector between the USB connector 31 on the side of the UIB 23 having a function of outputting the control information to the display 13 and the USB connector 24 on the side of the main board 21 can be rapidly selected, and thus the communication with the external device and the control information output to the display 13 become possible.

Also, since the control information for controlling the printer 12 input from the USB connector 24 and the control information of the printer 12 separated by the signal separation circuit 34 of the UIB 23 are selected by the selection switch 27 and input to the common USB controller 26, the control information for the printer 12 input and separated from the USB connector 31 and the control information input from the USB connector 24 can be processed by the common communication unit. As a result, by making the circuit commonly used, unnecessary circuit configuration can be omitted, and thus the configuration and operation thereof can be efficient.

In the first embodiment as described above, the case where the selection switch 27 has already been shifted to the side of the UIB 23 or the USB connector 24 in accordance with the configuration of the POS terminal system 10 has been exemplified. On the other hand, it is also possible that the signal input state of the selection switch 27 is detected by an input state detection signal ST as indicated in dot dash line in FIG. 2, and the selection switch 27 is made to be shifted to the side to which the signal has first been input (the side of the UIB 23 or the USB connector 24) by the switch selection signal CSW as indicated in dot dot dash line, so that the selection switch 27 is shifted to the side to which the signal has first been input.

It is also possible that the selection switch 27 is preferentially shifted to any one side between the UIB 23 and the USB connector 24 by the switch selection signal CSW. In this case, it is also possible that the main controller 25 is configured to be preferentially shifted to the side of the UIB 23 by detecting the mount state of the UIB 23 instead of detecting the input state detection signal ST.

Second Embodiment

Figure 3:
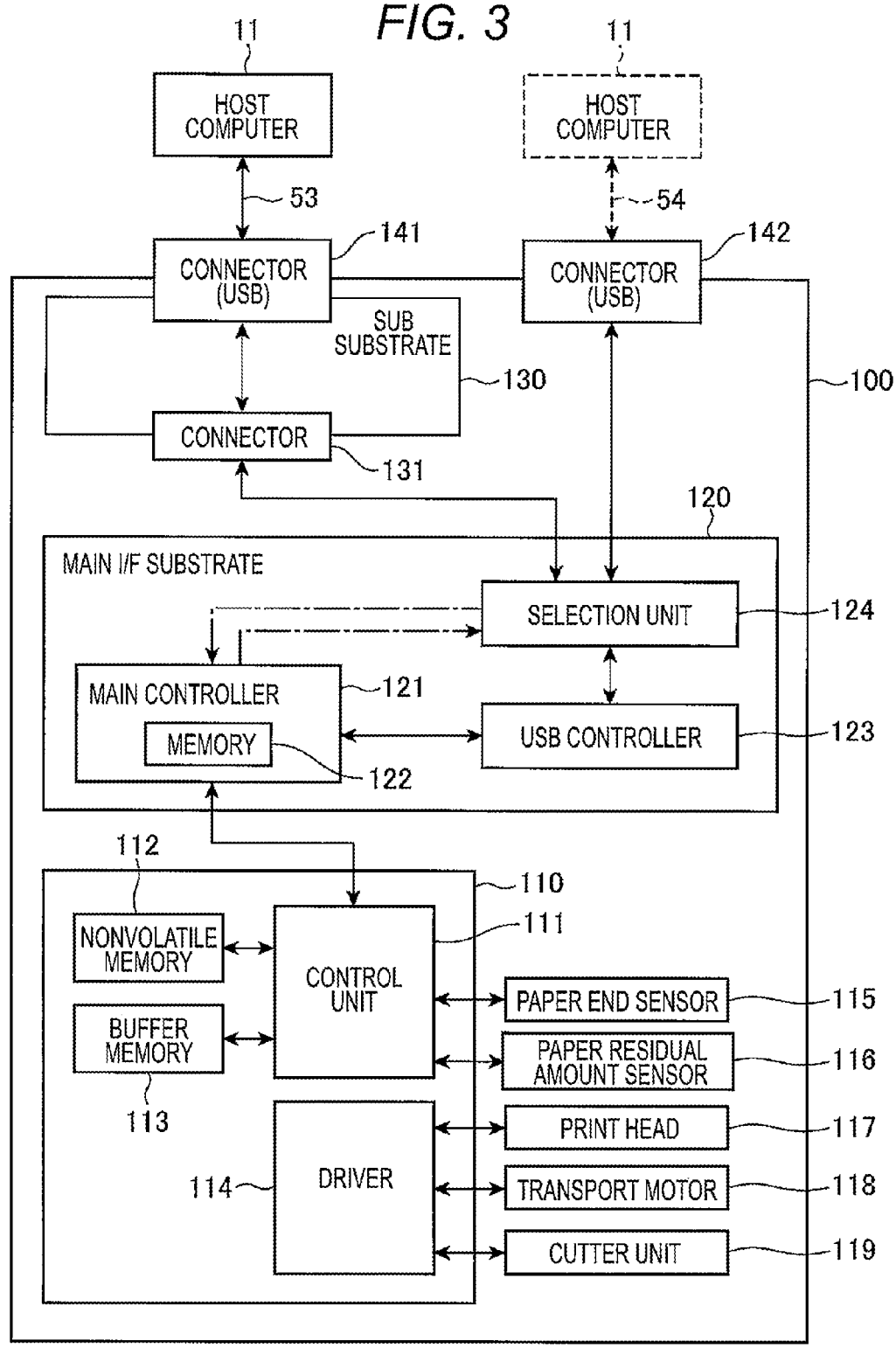
FIG. 3 is a block diagram illustrating the configuration of a printer according to a second embodiment of the present invention.

FIG. 3 is a block diagram illustrating the configuration of a printer 1 according to a second embodiment of the present invention.

The printer 100 is a device which is connected to the host computer 11 as the external device and prints (records) text or image on a recording medium based on data input from the host computer 11. In this embodiment, as an example, a thermal printer which accommodates a thermal roll paper as a recording medium in the main body and prints text or image by applying heat to the recording surface of the thermal roll paper through a print head 117 having a heating element will be described.

The printer 100 includes a print engine 110, a main interface substrate (main body substrate) 120 that controls communication between the printer 100 and the host computer 11 externally connected to the printer 100, and a sub substrate (interface substrate) 130.

The print engine 110 includes a control unit 111 controlling respective units of the printer 100, a nonvolatile memory 112 storing programs executed by the control unit 111 and various kinds of data, a buffer memory 113 temporarily storing the data received from the host computer 11, and a driver (drive circuit) 114 executing printing by controlling the drive unit provided in the printer 100. To the control unit 111, a paper end sensor 115 and a paper residual amount sensor 116 are connected. The nonvolatile memory 112, specifically, is configured by a semiconductor memory device such as an EEPROM or a flash memory. The buffer memory 113 is a volatile memory that stores commands or data input from the main interface substrate 120 to the control unit 111 in the order of their reception.

The printer 100 includes a print head 117 for printing on the thermal roll paper, a transport motor 118 rotating a transport roller (not illustrated) that transports the thermal roll paper, and a cutter unit 119 cutting the thermal roll paper after printing.

The driver 114 is connected to the transport motor 118 and the cutter unit 119 provided in the printer 100. The driver transports the thermal roll paper as long as that required by outputting a drive current and a drive pulse to the transport motor 118, and controls the cutter unit 119 to cut the thermal roll paper in a predetermined timing by outputting the drive current to the cutter unit 119.

Also, the paper end sensor 115 connected to the control unit 111 detects the existence/nonexistence of the thermal roll paper on a transport path of the thermal roll paper, and the paper residual amount sensor 116 is a sensor that detects whether the residual amount of the thermal roll paper is smaller than a predetermined amount. The respective detected values are output to the control unit 111.

The control unit 111 executes the program read from the nonvolatile memory 112, performs a turn-on/off control of the respective heating elements by driving a head driver (not illustrated) connected to the print head 117 based on the command and data stored in the buffer memory 113 and the detected values of the paper end sensor 115 and the paper residual amount sensor 116, and performs the printing on the thermal roll paper by operating the transport motor 118 and the cutter unit 119 through control of the driver 114.

The control unit 111 is connected to the main controller 121 packaged on the main interface substrate 120. The main controller 121 is connected to the USB controller 123 and the selection unit 124, which are packaged on the main interface substrate 120 together with the main controller 121. The USB controller 123 is configured to operate as a slave device (second-degree device) with respect to the host computer 11 (main device) by controlling communication through the USB.

The printer 100 is provided with two USB connectors: a connector (a part of second interface) 142 installed on a side surface of the printer 100 to be exposed to the outside and a connector (a part of first interface) 141 installed on a rear surface of the printer 100 to be exposed to the outside. These connectors 141 and 142 are provided with, for example, two power supply terminals and two data terminals (D+ and D−) based on the USB standard, and are connected to the host computer 11 through USB cables 53 and 54.

The connector 141 is installed on the sub substrate 130 that is connected to the main interface substrate 120 through the connector 131. The connector 141 is connected to the selection unit 124 installed on the main interface substrate 120 through the connector 131. Also, the connector 142 is directly connected to the selection unit 124.

The connectors 141 and 142 function as the first interface and the second interface in cooperation with the USB controller 123.

The selection unit 124 is interposed between the connectors 141 and 142 and the USB controller 123. The selection unit 124 selects any one of the connectors 141 and 142 and connects the selected connector to the USB controller 123 under the control of the main controller 121. The connection to the connectors 141 and 142 is performed exclusively and selectively, and thus it may not be possible to simultaneously connect both the connectors 141 and 142 to the host computer 11. Accordingly, in FIG. 3, the host computer 11 connected to the connector 141 is indicated by solid line and the host computer 11 connected to the connector 142 is indicated by imaginary line.

In the case where the host computer 11 is connected to the connectors 141 and 142, the communication control with the host computer 11 is performed by the function of the main controller 121, and the print is performed by the print engine 110 according to the command and data transmitted from the host computer 11. In this operation, the main controller 121 selects any one of the connectors 141 and 142 through the selection unit 124.

The main controller 121 is provided with a memory 122. The memory 122 is a storage unit for storing designation information for designating which of the connectors 141 and 142 is selected by the selection unit 124. The stored designation information is called a memory switch. The designation may be performed by a command from the host computer 11. In this case, it is necessary that the host computer 11 is connected to the connected on the previously selected side. After the designation by the command, communication from the designated connector becomes possible. The main interface substrate 120, in the case where both the connectors 141 and 142 are usable, connects the connector designated by the designation information of the memory 2 through the selection unit 124. A DIP switch may be mounted on the main interface substrate 120 to designate any one of the connectors 141 and 142. When power is supplied through manipulation of a power switch (not illustrated) of the printer 100, when a reset command is received from the host computer 11, or when a reset signal for instructing a reset is received from the host computer 11, the main controller 121 acquires the designation of the memory switch or a DIP switch, and designates any one of the connectors 141 and 142.

Also, the sub substrate 130 may be separated from the main body of the printer 100, and is electrically detachable with respect to the main interface substrate 120. Accordingly, the sub substrate 130 may not be connected during starting of the printer 100, and thus the printer 100 may be connectable to the host computer 11 only through the connector 142. In this case, the main controller 121, even if the connector 141 is designated by the designation information stored in the memory 122, can select the connector 142 that is the sole usable interface through the selection unit 124.

If the power is input by the manipulation of the power switch (not illustrated), the printer 100 operates to detect whether the host computer 11 is connected to the connectors 141 and 142. Since the connectors are connected to the USB controller 26, the connection of the host computer 11 can be automatically detected through the procedure prescribed in the USB standard.

Figure 4:
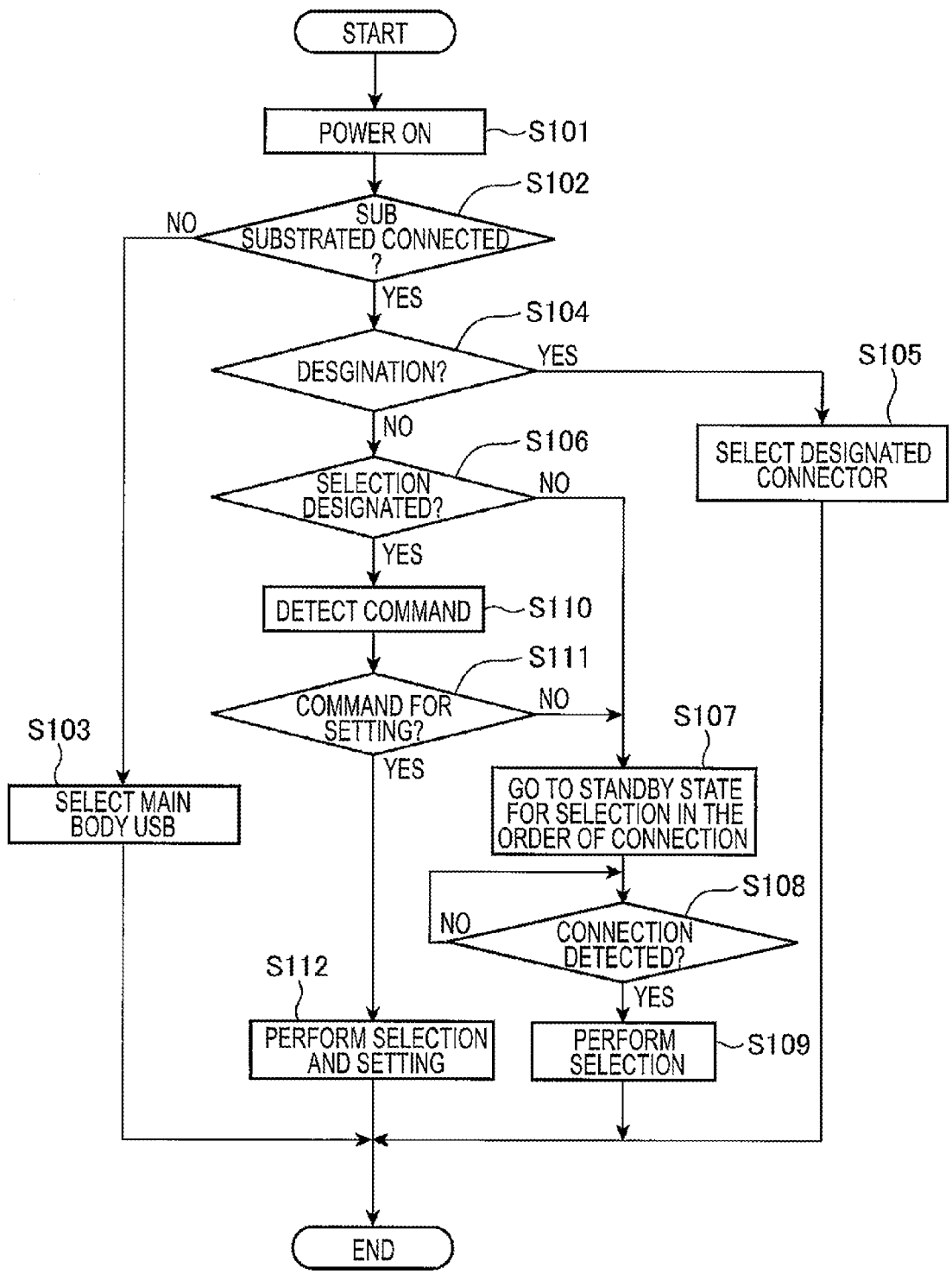
FIG. 4 is a flowchart illustrating an operation of a printer.

FIG. 4 is a flowchart illustrating the operation of a printer 100, and shows the operation until the selection unit 124 selects any one of the connectors 141 and 142 under the control of the main controller 121.

If the power of the printer 100 is input (step S101), the main controller 121 determines whether the sub substrate 130 is connected to the printer 100 (step S102). If the sub substrate 130 is not connected to the printer 100 ("No" in step 102), the main controller 121 controls the selection unit 124 to select the connector 142 (step S103), and goes to a state communicable with the host computer 11 to end the process.

If the sub substrate 130 is connected to the printer 100 ("Yes" in step S102), the main controller 121 determines whether any one of the connectors 141 and 142 is designated as the side that is preferentially selected by the designation information stored in the memory 122 (step S104). If any one connector is designated by the designation information ("Yes" in step S104), the main controller 121 selects the connector designated by the designation information between the connectors 141 and 142 (step S105), and goes to a state communicable with the host computer 11 to end the process.

Also, if the connector is not designated by the designation information stored in the memory 122 ("No" in step S104), the main controller 121 determines whether to perform setting for the designation of the connectors 141 and 142 (step S106). That is, the main controller determines whether to store new designation information in the memory 122 or to update the designation information. Whether to perform the setting may be designated by the designation information pre-stored in the memory 122.

Here, in the case where the setting is not performed ("No" in step S106), the main controller 121 goes to a standby state for preferentially selecting the connector which has been first connected to the host computer 11 (step S107), and waits for until the connection of the host computer 11 is detected (step S108). If it is detected that the host computer 11 is connected to any one connector ("Yes" in step S108), the main controller 121 controls the selection unit 124 to select the connector on the side where the connection is detected (step S109), and goes to a state communicable with the host computer 11 to end the process.

If the setting for the designation of the connector is performed in the printer 100 ("Yes" in step S106), the main controller 121 detects a command input from the host computer 11 (step S110), and determines whether the detected command is a command for setting (step S111). If the detected command is not the command for setting ("No" in step S112), the processing proceeds to step S107, while if the detected command is the command for setting ("Yes" in step S112), the main controller 121 generates or updates the designation information according to the command to store the result in the memory 122, controls the selection unit 124 to select the connector on the side designated by the designation information (step S112), and goes to the state communicable with the host computer 11 to end the process.

Figure 5:
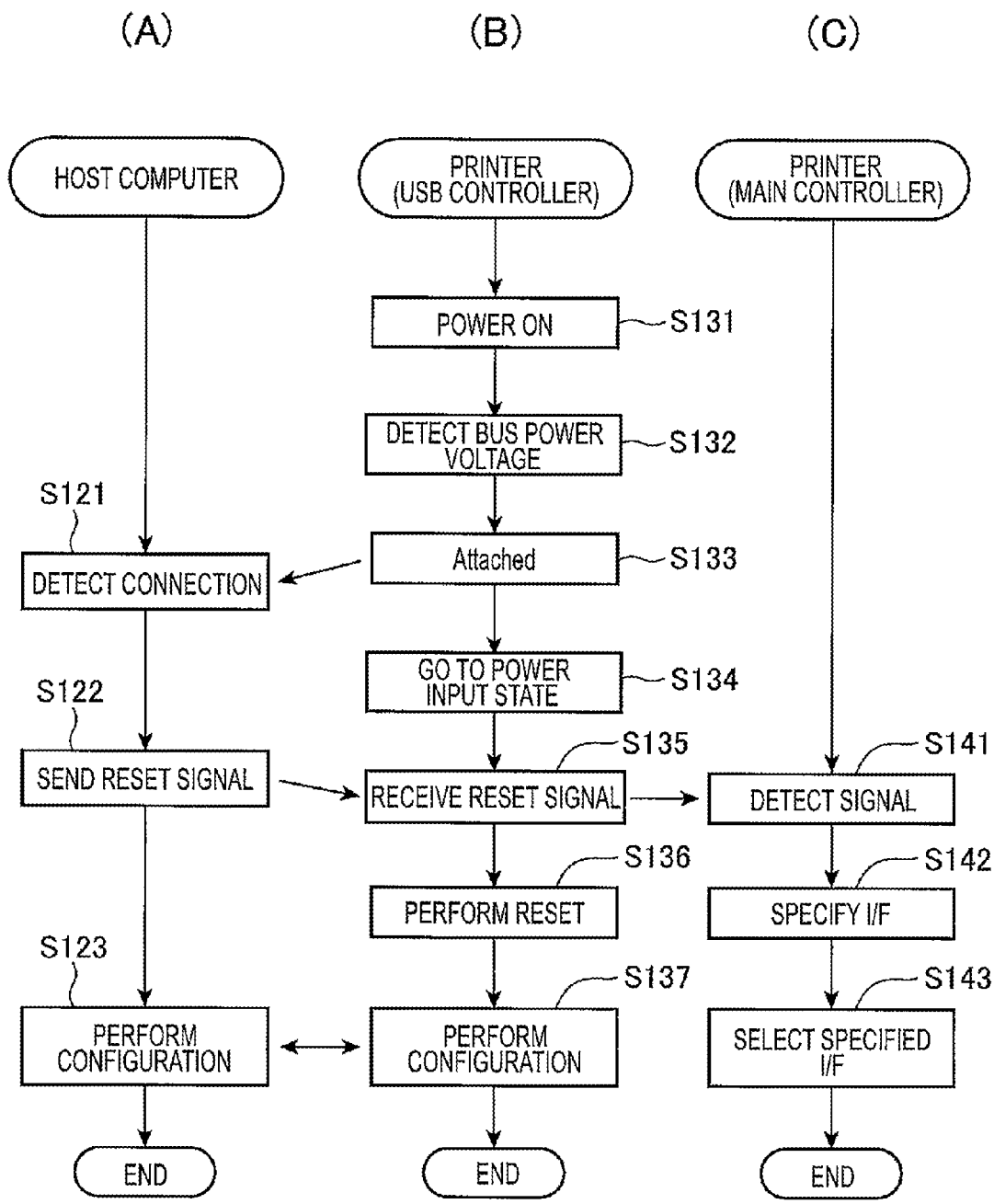
FIGS. 5A, 5B, and 5C are flowcharts illustrating an operation example of a printer.

FIGS. 5A, 5B, and 5C are flowcharts illustrating an operation example of a printer. FIG. 5A shows the operation of the host computer 11, FIG. 5B shows the operation of the USB controller 123, and FIG. 5C shows the operation of the main controller 121.

The USB controller 123, if the power of the printer 100 is turned on (step S131), detects a bus power voltage of the connectors 141 and 142 (step S132). In step S132, the voltage and signal can be input from any one of the connectors 141 and 142 to the USB controller 123 through the selection unit 124, and the bus power voltage is applied to the USB controller 123 even if the host computer 11 is connected to any one of the connectors 141 and 142.

In the case where the host computer 11 is connected to any one of the connectors 141 and 142, a voltage of +5V is supplied from the host computer 11 through the USB cables 53 and 54, and thus the USB controller 123 detects this voltage.

The USB controller 123, which has detected the bus power voltage, goes to a connection detected state (step S133), and the host computer 11 detects the connection of the slave device (step S121). Thereafter, the USB controller 123 goes to a power input state, i.e. a typical operation state (step S134), and the host computer 11 transmits a reset signal to the printer 100 (step S122).

Here, the main controller 121 detects that the reset signal has been input from any one of the connectors 141 and 142 with respect to the USB controller 123 (step S141), and specifies which of the connectors 141 and 142 is the connector from which the reset signal has been input (step S142). Also, the main controller 121 makes the selection unit 124 to select the connector on the specified side (step S143).

Accordingly, the connector to which the host computer 11 is connected through the selection unit 124 is connected to the USB controller 123.

The USB controller 123 receives the reset signal input from the host computer 11 (step S135), performs initialization of the communication state, and initializes the print operation of the printer 1 by transmitting a reset signal to the control unit 111 (step S136). Thereafter, the USB controller 26 and the host computer 11 perform configuration by mutually transmitting/receiving the set values and the like (steps S123 and S137), and then perform the typical operations.

As described above, according to the printer 100 of the second embodiment of the present invention, the printer 100 that is connectable to the host computer 11 includes the main interface substrate 120, the sub substrate 130 detachably connected to the main interface substrate 120, a connector 141 installed on the sub substrate 130 and connectable to the host computer 11, the connector 142 installed on the main interface substrate 120 and connectable to the host computer 11, the selection unit 124 selecting the interface of any one of the connector 141 on the side of the sub substrate 130 and the connector 142 on the side of the main interface substrate 120, and the print engine 110 transmitting/receiving information with the host computer 11 through the interface selected by the selection unit 124, wherein the selection unit 124, under the control of the main controller 121, selects the pre-designated connector or preferentially selects the connector in which the connection to the host computer 11 has been detected among the connector 141 and the connector 142.

Accordingly, in the configuration where the connector 141 that is connectable to the host computer 11 is provided on the sub substrate 130 and the connector 142 is provided on the side of the main interface substrate 120, the selection unit 124, which selects either of the selectors, selects the pre-designated connector or preferentially selects the connector in which the connection to the host computer 11 has been detected. Accordingly, since the designated connector or the connector on the side where the user has actually connected to the host computer 11 is selected, the connector (interface) on the necessary side can be rapidly and efficiently selected, and thus the communication with the host computer 11 can be performed.

Also, since the printer 100 is provided with the memory 122 for storing the designation information for designating any one connector between the connectors 141 and 142, and the main controller 121 that controls the selection unit 124 acquires the designation information of the memory 122 when the power of the printer 100 is input, when the reset command is received from the host computer 11, or when the reset signal is received from the host computer 11, and selects the designated connector based on the designation information, it is possible to easily designate the interface to be selected through the designation information.

Further, if a specified command that includes the information for designating any one interface is received from the host computer 11, the selection unit 124 selects the interface designated by the specified command, and thus the connector to be selected can be easily designated by transmitting the command from the host computer 11.

Also, even in the case where the selection unit 124 is pre-designated to select the connector 141 based on the designation information of the memory 122 under the control of the main controller 121 in the printer 100, the connector 142 is selected if the sub substrate 130 is not connected to the main interface substrate 120, and thus even in the case where the sub substrate 130 is not connected due to the maintenance circumstances or an operational error, the communication can be performed by connecting the host computer 11 by the connector 142. Accordingly, in the case where the selection of the designated interface is not possible, another interface is selected regardless of the designation, and thus the possibility of connection to the external device is constantly maintained.

Also, in the printer 100, since the connectors 141 and 142 are all USB connectors that can detect the connection state with the host computer 11 and the selection unit 124 first selects the connector in which the connection to the host computer 11 has been detected between the connectors 141 and 142, the connector can be rapidly selected, and thus the communication with the host computer 11 becomes possible.

In the second embodiment of the present invention, a method of storing the designated information in the memory 122 has been described as the method of pre-designating the connectors 141 and 142 preferentially selected. However, for example, a DIP switch for indicating the preferentially selected connector may be installed and by selecting the DIP switch, any one of the connectors 141 and 142 may be designated. In this case, the connector is designated according to the physical state of the switch. By manually manipulating the physical switch of the printer 100 as viewing the state of the switch with eyes, the connectors 141 and 142 can be easily designated.

Also, the detailed configuration of the selection unit 124 is not specifically limited, and the selection unit 124 may be implemented by a hardware circuit or may be virtually implemented by software.

Figure 6:
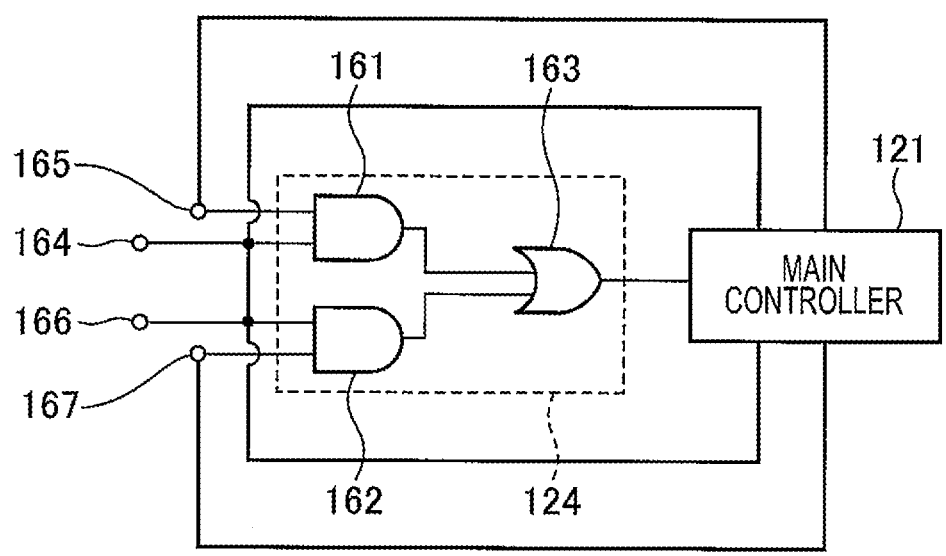
FIG. 6 is a diagram illustrating a detailed configuration example of a selection unit.

FIG. 6 is a diagram illustrating a detailed configuration example of a selection unit 124. As illustrated in FIG. 6, the selection unit 124 can be configured by a circuit indicated by gate devices 161, 162, and 163. The gate device 161 constituting the logical configuration of the selection unit 124 is an AND gate the output of which goes to a high level when inputs of input terminals 164 and 165 coincide with each other, and the gate device 162 is an AND gate the output of which goes to a high level when inputs of input terminals 166 and 167 coincide with each other. Also, the gate device 163 is an OR gate which outputs a high-level output when either of outputs of the gate devices 161 and 162 goes to a high level.

The connector 141 is connected to the input terminal 164, and the connector 142 is connected to the input terminal 166. Also, the main controller 121 is connected to the input terminals 165 and 167, and the main controller 121 can select the inputs of the input terminals 165 and 167.

In the initial state, i.e. in a state where the selection unit 124 selects neither of the connectors 141 and 142, the inputs of the input terminals 165 and 167 are kept at a high level by the main controller 121. If the host computer 11 is connected to the connector 141 and the input of the input terminal 164 goes to a high level, the output of the gate device 161 is changed from a low level to a high level. Accordingly, the output of the gate device 163 is changed to a high level, and the main controller 121 detects the connection of the host computer 11. Here, the main controller 121 changes the output to the input terminal of the gate device (here, gate device 162) on the side where its output is at a low level between the gate devices 161 and 162 to a low level. Accordingly, the output of the gate device 162 is kept at a low level. Also, the gate device 161, the output of which has been changed to a high level, changes its output so that its output becomes equal to the signal input from the input terminal 164. That is, a signal is output from the connector, to which the signal from the host computer 11 has been input, through the gate device 163. As described above, by the hardware circuit configuration, the function of the selection unit 124 that selects the connector under the control of the main controller 121 can be implemented. According to the configuration of FIG. 6, the output of the gate device 163 is input to the USB controller 123.

The above-described embodiments are examples to which the present is applied, and thus the present invention is not limited thereto. For example, although in the above-described embodiments, it is exemplified that the connector 142 is configured as a USB interface and the connector 141 is configured as a legacy interface, the present invention is not limited thereto. For example, a plurality of legacy interfaces may be installed, and IEEE1394 interfaces may be installed as the interfaces having the detection function. The number of interfaces and the types thereof are not specifically limited. The connector 24 and the connector 142 can be mounted on the main board 21 and the main board 120.

Also, the electronic device to which the present invention can be applied is not specifically limited, and it is sufficient if it is a printer that can control the recording speed onto the recording medium. For example, it can be applied to a dot-impact printer, an ink jet printer, a dye sublimation printer, a laser printer, and the like, and further to a printer built in another device, and its application is not limited.

In the foregoing description, it is exemplified that the electronic device is a printer. However, the present invention can be applied to any electronic device which has a communication controller and a plurality of interfaces connectable to an external host computer. Specifically, the present invention can also be applied to a hard disc device or an optical disc recording device.

What is claimed is:

1. A printer which is connectable to an external device, comprising:
   a main board;
   an interface board which is detachably connected to the main board;
   a first USB connector which is installed on the interface board side, the first USB connector which is connectable to the external device;

a second USB connector which is installed on the main board side, the second USB connector which is connectable to the external device;

a selection unit that exclusively selects one of the first USB connector on the interface board side and the second USB connector on the main board side; and a single USB controller that communicates information with the external device through the first or second USB connector, which is selected by the selection unit;

a printing mechanism; and a main controller that controls the printing mechanism to perform printing based on a signal from the external device, wherein the selection unit exclusively selects one of the first and second USB connectors, which is pre-designated or exclusively selects one of the first and second USB connectors, which first receives the signal from the external device, wherein the main controller, the selection unit and the USB controller are installed on the main board, wherein the main controller determines whether one of the first and second USB connectors is pre-designated by designation information stored in a memory in the main controller or indicated by a DIP switch in the main controller when the printer is powered on, wherein the selection unit exclusively selects the one of the first and second connectors if the one of the first and second USB connectors is pre-designated by the designation information, and the main controller goes to a standby state if the one of the first and second USB connectors is not pre-designated by the designation information, and wherein in the standby state, the selection unit exclusively selects one of the first and second USB connectors, which first receives the signal from the external device.

2. The printer according to claim 1, further comprising the DIP switch that designates one of the first USB connector and the second USB connector, or a storage unit that stores information for designating one of the first USB connector and the second USB connector, wherein the selection unit acquires designation information of the DIP switch or the storage unit when the printer is powered on or when receiving a reset command or a reset signal from the external device and the selection unit exclusively selects the one of the first and second USB connectors, which is pre-designated by the designation information.

3. The printer according to claim 1, wherein when receiving a predetermined command including information for designating one of the first USB connector and the second USB connector, the selection unit exclusively selects the one of the first and second USB connectors, which is pre-designated by the information in the predetermined command.

4. The printer according to claim 2, wherein the selection unit selects the second USB connector when the first USB connector is pre-designated by the designation information of the DIP switch or the storage unit and the interface board is not connected to the main board.

5. The printer according to claim 1, further comprising a third connector which is installed on the interface board side, the third connector which is connectable a controlled device, wherein the second USB connector is configured to receive control information for controlling the printer from the external device, wherein the first USB connector is configured to receive the control information for controlling the printer and control information for controlling the controlled device from the external device, wherein the interface board is provided with a separation unit that discriminates and separates the control information for the printer and the control information for the controlled device, which are input from the external device through the first USB connector, and wherein the separation unit outputs the separated control information for the controlled device to the controlled device through the third connector and outputs the separated control information for the printer to the selection unit on the main board.

6. The printer according to claim 5, wherein the control information for the printer, which is input through the second USB connector and the control information for the printer, which is separated by the separation unit of the interface board are selected by the selection unit, and then input to the USB controller in common.

7. A method of controlling a printer which is connectable to an external device, the printer including: a main board; an interface board which is detachably connected to the main board; a first USB connector which is installed on the interface board side, the first USB connector which is connectable to the external device; a second USB connector which is installed on the main board side, the second USB connector which is connectable to the external device; a selection unit that exclusively selects one of the first USB connector on the interface board side and the second USB connector on the main board side; a single USB controller that communicates information with the external device through the first or second USB connector, which is selected by the selection unit; a printing mechanism; and a main controller that controls the printing mechanism to perform printing based on a signal from the external device, the method comprising:

exclusively selecting, by the selection unit, one of the first and second USB connectors, which is pre-designated or exclusively selecting one of the first and second USB connectors, which first receives the signal from the external device;

communicating, by the USB controller, information with the external device through the selected USB connector; and determining, by the main controller, whether one of the first and second USB connectors is pre-designated by designation information stored in a memory in the main controller or indicated by a DIP switch in the main controller when the printer is powered on, wherein the main controller, the selection unit and the USB controller are installed on the main board, wherein the selection unit exclusively selects the one of the first and second connectors if the one of the first and second USB connectors is pre-designated by the designation information, and the main controller goes to a standby state if the one of the first and second USB connectors is not pre-designated by the designation information, and wherein in the standby state, the selection unit exclusively selects one of the first and second USB connectors, which first receives the signal from the external device.

8. The method according to claim 7, wherein the printer further includes the DIP switch that designates one of the first USB connector and the second USB connector, or a storage unit that stores information for designating one of the first USB connector and the second USB connector, wherein the method further comprises acquiring designation information of the DIP switch or the storage unit when the printer is powered on or when receiving a reset command or a reset signal from the external device, and
wherein the one of the first and second USB connectors, which is pre-designated by the designation information is exclusively selected in the selecting.

9. The method according to claim 7, wherein when receiving a predetermined command including information for designating one of the first USB connector and the second USB connector, the one of the first and second USB connectors, which is pre-designated by the information in the predetermined command is exclusively selected in the selecting.

10. The method according to claim 8, wherein the second USB connector is selected in the selecting when the first USB connector is pre-designated by the designation information of the DIP switch or the storage unit and the interface board is not connected to the main board.

11. The method according to claim 7,
wherein the printer further includes a third connector which is installed on the interface board side, the third connector which is connectable to a controlled device,
wherein the second USB connector is configured to receive control information for controlling the printer from the external device,
wherein the first USB connector is configured to receive the control information for controlling the printer and control information for controlling the controlled device from the external device, and
wherein the method further comprises:
discriminating and separating, by the interface board, the control information for the printer and the control information for the controlled device, which are input from the external device through the first USB connector;
outputting the separated control information for the controlled device to the controlled device through the third connector, and
outputting the separated control information for the printer to the selection unit on the main board.

12. The method according to claim 11, further comprising inputting the control information for the printer, which is input through the second USB connector and the control information for the printer, which is separated by the separation unit of the interface board, to the USB controller in common.

13. A non-transitory recording medium recording a program causing a main controller of a printer to execute a method of controlling the printer which is connectable to an external device, the printer including: a main board; an interface board which is detachably connected to the main board; a first USB connector which is installed on the interface board side, the first USB connector which is connectable to the external device; and a second USB connector which is installed on the main board side, the second USB connector which is connectable to the external device; a selection unit that exclusively selects one of the first USB connector on the interface board side and the second USB connector on the main board side; a single USB controller that communicates information with the external device through the first or second USB connector, which is selected by the selection unit; a printing mechanism; and the main controller that controls the printing mechanism to perform printing based on a signal from the external device, the method comprising:
exclusively selecting, by the selection unit, one of the first and second USC connectors, which is pre-designated or exclusively selecting one of the first and second USB connectors, which first receives the signal from the external device;
communicating, by the USB controller, information with the external device through the selected USB controller; and
determining, by the main controller, whether one of the first and second USB connectors is pre-designated by designation information stored in a memory in the main controller or indicated by a DIP switch in the main controller when the printer is powered on,
wherein the main controller, the selection unit and the USB controller are installed on the main board,
wherein the selection unit exclusively selects the one of the first and second connectors if the one of the first and second USB connectors is pre-designated by the designation information, and the main controller goes to a standby state if the one of the first and second USB connectors is not pre-designated by the designation information, and
wherein in the standby state the selection unit exclusively selects one of the first and second USB connectors, which first receives the signal from the external device.

* * * * *